(12) United States Patent
Last

(10) Patent No.: US 7,748,215 B2
(45) Date of Patent: Jul. 6, 2010

(54) ANTI-CAVITATION MANIFOLD FOR DRIVE COUPLED, DUAL MOTOR REVERSIBLE HYDRAULIC DRIVE WINDING AND UNWINDING SYSTEMS

(76) Inventor: Harry J. Last, 1010 Koohoo Pl., Kailua, HI (US) 96734

( * ) Notice: Subject to any disclaimer, the term of this patent is extended or adjusted under 35 U.S.C. 154(b) by 414 days.

(21) Appl. No.: 12/015,189

(22) Filed: Jan. 16, 2008

(65) Prior Publication Data

US 2008/0178587 A1 Jul. 31, 2008

Related U.S. Application Data

(60) Provisional application No. 60/886,755, filed on Jan. 26, 2007.

(51) Int. Cl.
*F16D 31/02* (2006.01)
(52) U.S. Cl. .............................. 60/424; 60/484; 60/494
(58) Field of Classification Search ................... 60/419, 60/424, 473, 484, 494
See application file for complete search history.

(56) References Cited

U.S. PATENT DOCUMENTS 5,546,751 A * 8/1996 Last ............................ 60/424

* cited by examiner

*Primary Examiner*—Michael Leslie
(74) *Attorney, Agent, or Firm*—David E Newhouse, Esq.

(57) ABSTRACT

An improved anti-cavitation hydraulic manifold for hydraulically coupling the hydraulic input and output of two, drive coupled, reversible hydraulic motors and a reversible source of hydraulic power for winding and unwinding systems is described wherein a stop confines a shuttle ball within each of two input/output (I/O) chambers receiving driving hydraulic input liquid from the reversible source of hydraulic power between an annular valve seat around a bypass passage communicating between the bases of the input/output (I/O) chambers and any ports penetrating into the respective input/output (I/O) chambers supplying high pressure or driving hydraulic input from the reversible source of hydraulic power where, responsive to supplied high pressure or driving hydraulic input to a particular I/O chamber, the shuttle ball in the chamber seats upon the particular annular valve seat translating a shuttle rod in the bypass passage unseating the particular shuttle ball from the annular valve seat around the passageway in the other I/O chamber.

3 Claims, 1 Drawing Sheet

ANTI-CAVITATION MANIFOLD FOR DRIVE COUPLED, DUAL MOTOR REVERSIBLE HYDRAULIC DRIVE WINDING AND UNWINDING SYSTEMS

BACKGROUND OF THE INVENTION

1. Field of the Invention

The invention relates to drive coupled, dual motor, reversible hydraulic drive winding systems, and in particular, to an improved anti-cavitation hydraulic manifold hydraulically coupling the hydraulic inputs and outputs of the respective motors to a reversible source of hydraulic power.

2. Description of the Prior Art

In U.S. Pat. No. 5,546,751 entitled An Anti-Cavitation Manifold for Drive Coupled, Dual Motor, Reversible Hydraulic Drive Systems (the '751 patent), summarizing, the Applicant describes his anti-cavitation hydraulic manifold as being:

"... easily and inexpensively fabricated by drilling a single passageway through a single block of material. The ends of the passageway are then enlarged and threaded forming two high-pressure input/output (I/O) chambers adapted for coupling to two conventional hydraulic lines connectable to a reversible source of hydraulic power. Conical valve seats are machined into each end of the passageway opening into each of the enlarged input/output (I/O) chambers. A shuttle rod with a polygonal cross-section is introduced into the passageway connecting between the chambers, and a shuttle ball having a diameter greater than the passageway is placed in each enlarged input/output chamber. Each input/output (I/O) chamber includes a stop for confining the shuttle ball within the chamber. A common bypass passage is drilled through the block of material intercepting the passageway between the enlarged input/output (I/O) chambers establishing the bypass line for the two reversible motors. Two separate ports, each perpendicularly drilled into one of the enlarged input/output (I/O) chambers are threaded for coupling to the respective separate input/output lines of the reversible motors. The remaining input/output lines from the reversible motors hydraulically couple at each end of the bypass passage." [See Column 3, ll. 40-63, emphasis. added]

The Applicant specifies in the '751 patent specification with regard to the stops, at Column 6, ll. 62-67:

"Stops 22, preferably small diameter removable threaded rods, penetrate through a side face 44 of the manifold block 12 into the respective input/output chambers 14 & 16 for confining the steel shuttle balls 21 within the respective input/output chambers 14 & 16.

Referring to the schematic diagrams shown in FIGS. 1 & 3, the Applicant further observes at Column 7, lines 49-62 of the patent specification, that:

"For optimization, the hydraulic circuit may also include a flow restrictor 59, with a check valve bypass 61 incorporated into the respective input/output lines 29 & 31. However, as a practical matter the skilled hydraulic designer should recognize that the functional properties of such flow restrictor 59 and check valve bypass 61 are inherently provided by the shuttle balls 21 within the I/O chamber 14 & 16 being alternately positioned at their respective stops 22 (flow restriction), or seated upon their respective valve seats 18 (flow restriction bypass). Accordingly, it is possible to optimize the hydraulic circuit by adjusting the ratios of the respective diameters of the I/O chambers 14 & 16, the shuttle balls 21 and the stops 22.

Finally in claim 19 of the '751 patent the Applicant describes the means for retaining the balls within the respective input/output (I/O) chambers of claims 17-1, 17-2, & 17-3 as comprising:

" . . . a pin penetrating into the each input/output (I/O) chambers confining the ball proximate the annular valve seat." [Column 16, lines 41-45]

To the extent it is relevant to, and/or bears upon the discoveries and inventions herein set-forth, Applicant's U.S. Pat. No. 5,546,751 filed Oct. 14, 1994 and issued Aug. 20 1996 entitled 'An Anti-Cavitation Manifold for Drive Coupled, Dual Motor, Reversible Hydraulic Drive Systems' (the '751 patent) and the patents of Applicant referred to therein are incorporated by reference into this provisional patent application as though fully set forth at length at this point.

Schematically shown in FIG. 1, the anti-cavitation manifold described in the '571 patent performs as described if correctly installed with the high pressure input/output hydraulic line 24 from a reversible source of hydraulic power is coupled to the axial port 23. However, when the manifold is inadvertently incorrectly installed, schematically shown in FIG. 2, where the high pressure input/output hydraulic line 24 from a reversible source of hydraulic power is coupled to the perpendicular port 29 communicating into input/output (I/O) chamber 14, rather than the axial port 23 of I/O chamber 14, the hydraulic system unpredictably fails, locking or freezing the mechanical winding and unwinding components in place. (In such a mix-up, hydraulic line 26 incorrectly coupled to the axial port 23 of I/O chamber 14 connects to an input port of the driven reversible hydraulic drive 2 on the return side of the hydraulic loop.)

Such incorrect coupling of the hydraulic line 24 typically results from installer unfamiliarity or error. When the connection error is discovered (typically following an unexplained failure of the system to properly function sometime after installation) the hydraulic lines 24 & 26 must be disconnected and re-connected correctly to the manifold with an inevitable spillage of hydraulic liquid.

Analysis of the problem, revealed that the failure was attributable to the relative locations of the pin stop 22 and the port 29 perpendicularly penetrating into the input/output (I/O) chambers via the side face of the manifold 12. Simply stated, the port 29 was located between the pin and the annular valve seat at the base of the I/O chamber 14 (See FIGS. 1, 2a-c & 5 of the '751 patent) allowing hydraulic liquid flow from the incorrectly connected the input/output or power side of the hydraulic loop line from the reversible power source 46 to sometimes entrain the steel shuttle ball 21 in I/O chamber 14 trapping it against the stop 22, preventing it both from translating the shuttle rod 19 and seating on its annular valve seat 18 locking the system up.

Also, it was discovered during testing that, because of gravity, if the incorrectly connected manifold of the '751 patent was oriented or mounted such that the pin stop 22 was vertically below the shuttle ball, such that the shuttle ball rests against the pin rather than the protruding end of the shuttle rod, when the chamber 14 is not receiving driving hydraulic power from source of hydraulic power, the sporadic failures of the system and lock-ups were exacerbated.

SUMMARY OF THE INVENTION

An improved anti-cavitation hydraulic manifold for hydraulically coupling the hydraulic input and output of two, drive coupled, reversible hydraulic motors driven by a reversible source of hydraulic power for winding and unwinding systems is described wherein a stop confines a shuttle ball within each of two input/output (I/O) chambers receiving driving hydraulic input liquid from the reversible source of hydraulic power between an annular valve seat around a bypass passage communicating between the respective bases of the input/output (I/O) chambers and any ports penetrating into the respective input/output (I/O) chambers supplying high pressure or driving hydraulic input from the reversible source of hydraulic power where, responsive to supplied high pressure or driving hydraulic input to a particular I/O chamber, the shuttle ball in the chamber seats upon the particular annular valve seat translating a shuttle rod in the bypass passage unseating the particular shuttle ball from the annular valve seat around the passageway in the other I/O chamber.

The primary advantages afforded by the improved anti-cavitation manifold relate to elimination of installation errors because the shuttle balls within the input/output (I/O) chambers cannot be entrained either by the flow of the driving hydraulic liquid or by a force gradient due to gravity and/or acceleration. In short, functionality of the improved manifold is not compromised by its orientation in space.

Other advantages of the improved anti-cavitation manifold is that it affords installation convenience where design and/or space constraints mandate perpendicular rather than axial high pressure hydraulic couplings between the reversible source of hydraulic power and one or both of the respective input/output (I/O) chambers.

Other advantages of the improved anti-cavitation manifold relate to affording additional hydraulic input ports into the respective input/output (I/O) chambers for providing additional functional hydraulic capabilities.

DESCRIPTION OF PREFERRED AND EXEMPLARY EMBODIMENTS

Figure 1:
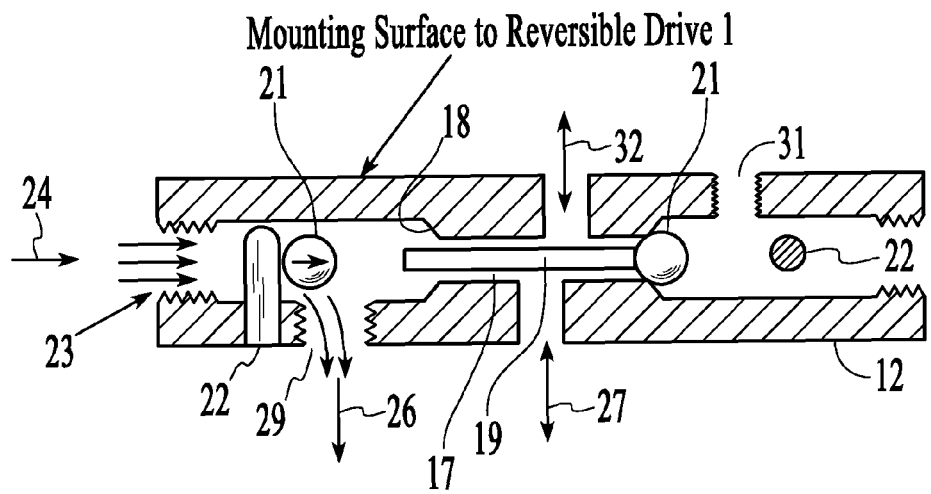
FIG. 1 is a schematic representation of the prior art anti-cavitation manifold of the Applicant's '751 patent correctly coupled into the hydraulic circuit.
Figure 2:
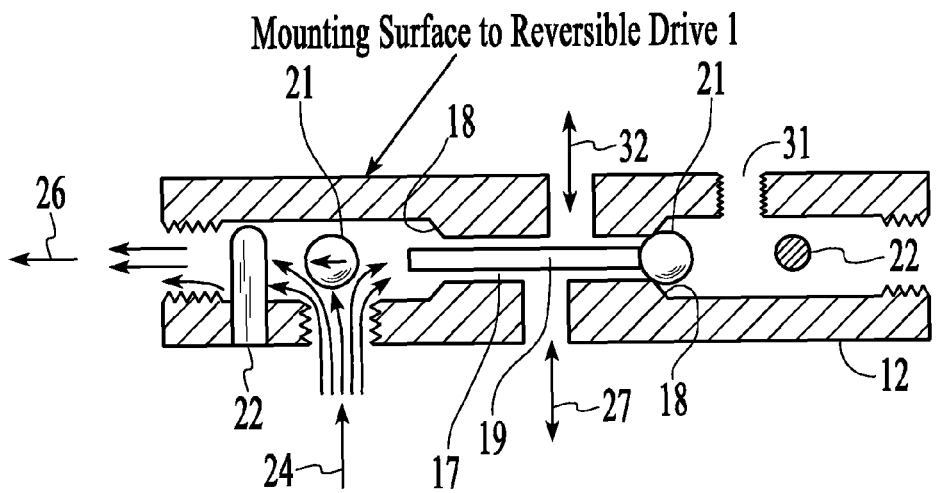
FIG. 2 is a schematic representation of the prior art anti-cavitation manifold of the Applicant's '751 patent incorrectly coupled into the hydraulic circuit.
Figure 3:
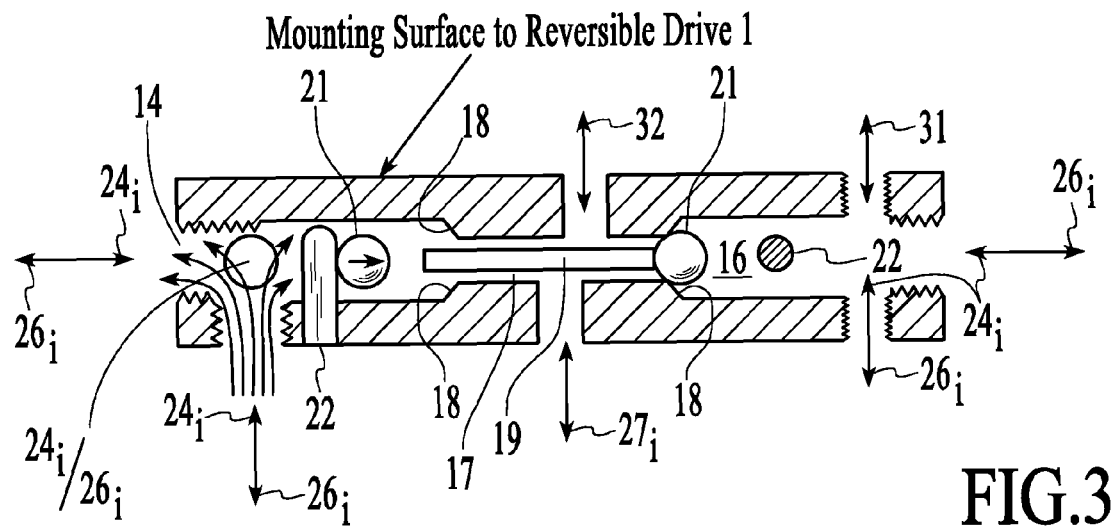
FIG. 3 is a schematic representation of the invented improved anti-cavitation manifold.

Looking at FIG. 3, the improved anti-cavitation hydraulic manifold 12 for hydraulically coupling the hydraulic input and output of two, drive coupled, reversible hydraulic motors (not shown) driven by a reversible source of hydraulic power (not shown) for winding and unwinding systems (not shown) is described wherein a pin stop 22 confines a shuttle ball 21 within each of two input/output (I/O) chambers 14 & 16 receiving driving hydraulic input liquid from the reversible source of hydraulic power between an annular valve seat 18 around a bypass passage 17 communicating between the respective bases of the input/output (I/O) chambers 14 & 16 and any and all ports $24_i$ and $26_i$ penetrating into the input/output (I/O) chambers 14 and 16, regardless of how connected, supplying high pressure or driving hydraulic input from the reversible source of hydraulic power where, responsive to supplied high pressure or driving hydraulic input to a particular I/O chamber, the shuttle ball 21 in a particular chamber seats upon the particular annular valve seat 18 translating a shuttle rod 19 in the bypass passage 17 unseating the particular shuttle ball 21 from the annular valve seat 18 around the passageway 17 in the other I/O chamber.

Additional hydraulic functionality of the improved anti-cavitation manifold is schematically indicated in FIG. 3 by the $24_i/26_i$ ports perpendicularly and axially penetrating into input/output (I/O) chamber 16. For example, when I/O chamber 16 shuttle ball 21 is seated on the annular valve seat 18 at the base of the I/O chamber responsive to high pressure or driving hydraulic power input supplied via axial port $24_i/26_i$—that particular perpendicular port $24_i/26_i$ is available to supply high pressure or driving hydraulic power input to other associated hydraulic components of the system during that phase of the hydraulic cycle. Conversely, when high pressure or driving hydraulic power input is supplied to I/O chamber 14, and the shuttle rod unseats the shuttle ball 21 in I/O chamber 16, both the axial and perpendicular ports $24_i/26_i$ can provide return hydraulic liquid flow for satisfying the demand of the driven reversible hydraulic motor (not shown) and/or provide a return flow to sump on the return side of the hydraulic circuit.

Also, as shown schematically in FIG. 3, the improved anti-cavitation manifold allows for ports through all of the side surfaces as well as the axial ends of the manifold block. As illustrated one side surface is bolted to the input/output face of reversible hydraulic drive 1 leaving the remaining surfaces available for accommodating perpendicular penetration ports $24_i/26_i$. Also, depending on space the improved anti-cavitation manifold block could accommodate one or more axial ports $24_i/26_i$. Unused ports $24_i/26_i$ can be closed using a threaded plug (not shown).

It should be recognized that skilled engineers and designers could specify different configurations for the described mechanisms implementing the invented improvement that performs substantially the same function, in substantially the same way to achieve substantially the same result as those components described and specified in this application. Similarly, the respective elements described for effecting the desired functionality could be configured differently, per constraints imposed by different mechanical systems, yet perform substantially the same function, in substantially the same way to achieve substantially the same result as those components described and specified by the Applicant above. Accordingly, while mechanical components suitable for implementing the invented improvement may not be exactly described herein, they may fall within the spirit and the scope of invention as described and set forth in the appended claims.

I claim:

1. In a manifold for hydraulically coupling a reversible source of hydraulic power for reversibly circulating hydraulic liquid for driving coupled, dual motor, reversible hydraulic drive of a winding and unwinding system, having:
   (i) two hydraulic input/output (I/O) chambers each hydraulically coupled to receive input liquid from the reversible source of hydraulic power, and each hydraulically coupled for providing liquid input to and receiving liquid output from one reversible hydraulic motor;
   (ii) a tubular bypass cavity hydraulically coupled to receive liquid from and provide liquid to both reversible hydraulic motors;
   (iii) a translation passageway having an opening into each input/output (I/O) chamber hydraulically establishing communication between each chamber and the tubular bypass cavity;
   (iv) a ball within each input/output (I/O) chamber settable upon a valve seat annularly surrounding the opening of the translation passageway for isolating the tubular bypass cavity from hydraulic liquid input from the reversible source of hydraulic power and for directing that liquid to the particular reversible hydraulic motor coupled to that chamber to rotate its actuator; and (v) a shuttle rod translating in the translation passageway having a cross section for permitting liquid to flow though the translation passageway and having a length longer than the translation passage for preventing the respective balls in the input/output (I/O) chambers from simultaneously seating upon the valve seats in the respective input/output (I/O) chambers;

an improvement comprising in combination therewith:

(vi) a stop within each input/output (I/O) chamber confining the ball within each chamber in a region between the valve seat annularly surrounding the opening of the translation passageway and all hydraulic couplings allowing the chamber to receive liquid from the reversible source of hydraulic power and to provide and receive liquid from one reversible hydraulic motor.

2. In a reversible hydraulic drive system including a reversible source of hydraulic power for reversibly circulating a hydraulic liquid, and two reversible hydraulic motors each having an actuator mechanically linked to that of the other, an anti-cavitation manifold including:

(i) a single block of material having a central tubular passageway with an enlarged cylindrical input/output (I/O) chamber at each end hydraulically coupled for receiving hydraulic liquid input from the reversible source of hydraulic power, and having an annular valve seat around an opening of the central tubular passageway into each of the enlarged cylindrical input/output (I/O) chambers;

(ii) a ball larger than the central tubular passageway located in each enlarged input/output chamber for seating upon the annular valve seat and isolating the central tubular passageway from liquid input flowing from the reversible source of hydraulic power;

(iii) a shuttle rod located in the central tubular passageway between the input/output (I/O) chambers, the rod having a cross-section for allowing liquid to flow through the central tubular passageway and having a length longer than the central tubular passageway for preventing the balls in the respective chambers from simultaneously seating upon the valve seats in the respective chambers;

(iv) a tubular bypass cavity penetrating through the block of material intercepting the tubular passageway between the input/output (I/O) chambers for hydraulically receiving liquid exhausting from and providing liquid input to one of the reversible hydraulic motors at each of its ends; and (v) two separate ports each penetrating into the block of material to one of the enlarged input/output (I/O) chambers for hydraulically providing liquid to and receiving liquid exhausting from one of the reversible hydraulic motors;

an improvement comprising in combination therewith:

(vi) a stop within each input/output (I/O) chamber confining the ball within each chamber in a region between the valve seat annularly around the opening of the central tubular passageway and all hydraulic couplings and ports allowing the chamber to receive liquid from the reversible source of hydraulic power and to provide and receive liquid from one reversible hydraulic motor.

3. In a reversible hydraulic drive system including a reversible source of hydraulic driving power for reversibly circulating a hydraulic liquid, and two reversible hydraulic motors having mechanically linked actuators wherein the actuator of one motor moves responsive movement of the actuator of the other motor causing that motor to functionally pump liquid, a means for preventing cavitation, including:

(i) two hydraulic input/output (I/O) chambers each for hydraulically receiving input from the reversible source of hydraulic power, and for providing liquid input to and receiving liquid output from one reversible hydraulic motor;

(ii) bypass means hydraulically communicating with each input/output (I/O) chamber for hydraulically receiving liquid from and providing liquid to both reversible hydraulic motors;

(iii) a ball located within each input/output (I/O) chamber for hydraulically isolating the bypass means from, and directing hydraulic liquid input circulating from the source of hydraulic power to the particular reversible hydraulic motor for moving its actuator; and (iv) means for preventing the input/output (I/O) chambers from being simultaneously isolated from the bypass means, an improvement comprising in combination therewith:

(v) means for confining the ball within each input/output (I/O) chamber within a region between the bypass means and any ports supplying output hydraulic driving power from the reversible source of hydraulic power to the input/output (I/O) chamber.

\* \* \* \* \*